(12) United States Patent
Gathmann

(10) Patent No.: US 8,484,973 B2
(45) Date of Patent: Jul. 16, 2013

(54) THERMAL ENERGY STORE

(75) Inventor: Nils Gathmann, Cologne (DE)

(73) Assignee: Flagsol GmbH, Cologne (DE)

( * ) Notice: Subject to any disclaimer, the term of this patent is extended or adjusted under 35 U.S.C. 154(b) by 1011 days.

(21) Appl. No.: 12/536,818

(22) Filed: Aug. 6, 2009

(65) Prior Publication Data
US 2010/0199669 A1 Aug. 12, 2010

(30) Foreign Application Priority Data
Aug. 6, 2008 (DE) .................. 10 2008 036 527

(51) Int. Cl.
*F03G 6/00* (2006.01)
*F01K 1/00* (2006.01)

(52) U.S. Cl.
USPC ............... 60/641.8; 60/659; 126/617

(58) Field of Classification Search
USPC ............ 60/641.8–641.15, 659; 126/617
See application file for complete search history.

(56) References Cited

U.S. PATENT DOCUMENTS

| | | | | |
|---|---|---|---|---|
| 4,192,144 A * | 3/1980 | Pierce | ............... | 60/641.8 |
| 4,235,221 A * | 11/1980 | Murphy | ............... | 126/567 |
| 6,957,536 B2 * | 10/2005 | Litwin et al. | ............... | 60/641.8 |
| 7,051,529 B2 * | 5/2006 | Murphy et al. | ............... | 60/641.8 |
| 7,296,410 B2 * | 11/2007 | Litwin | ............... | 60/641.12 |
| 2005/0126170 A1 * | 6/2005 | Litwin | ............... | 60/641.8 |

FOREIGN PATENT DOCUMENTS
DE 20 2008 002 599 5/2008
* cited by examiner

*Primary Examiner* — Hoang Nguyen
(74) *Attorney, Agent, or Firm* — Fay Kaplun & Marcin, LLP

(57) ABSTRACT

A method for alternate storage and outputting of the thermal energy which is obtained in the primary circuit of a solar-thermal power station, using a heat carrier medium, which can be partially fed between a plurality of storage tanks, in each case flowing through a heat transmission apparatus which is operatively connected to the primary circuit and/or to the steam/water circuit, which heat carrier medium can be heated to a higher temperature or can be cooled to a lower temperature, the aim is to provide a solution which makes it possible, with a storage capacity which is the same as that of installations known from the prior art, to avoid the disadvantages of the prior art, in particular with a smaller space requirement and occupying a smaller installation area. This is achieved in that at least one of the plurality of storage tanks is alternately used for storage of a respectively partially fed volume of the heat carrier medium in the state of its higher temperature and for storage of a respectively partially fed volume of the heat carrier medium in the state of its lower temperature.

11 Claims, 3 Drawing Sheets

THERMAL ENERGY STORE

FILED OF INVENTION

The present invention relates to a method for alternate storage and outputting of the thermal energy which is obtained in the primary circuit of a solar-thermal power station, by means of a heat carrier medium, which can be partially fed between a plurality of storage tanks, in each case flowing through a heat transmission apparatus which is operatively connected to the primary circuit and/or to the steam/water circuit, which heat carrier medium can be heated to a higher temperature or can be cooled to a lower temperature.

The invention also relates to a thermal energy store of a solar-thermal power station, which has a plurality of storage tanks which are connected to one another for carrying fluid, with an associated feed device and an associated heat transmission apparatus, which is operatively connected to the primary circuit and/or to the steam/water circuit of the solar-thermal power station, with a volume of heat carrier medium being stored in the plurality of storage tanks which heat carrier medium can partially be fed between individual storage tanks, flowing through the heat transmission apparatus and can be heated to a higher temperature or can be cooled to a lower temperature.

BACKGROUND INFORMATION

In conjunction with the storage of energy obtained in solar-thermal power stations, it is known for this energy to be stored in storage tanks with the aid of a molten salt as a heat carrier medium. This makes it possible to store energy in the heat carrier medium in the sunny phase during solar radiation, and to emit this energy in times when there is a lack of solar radiation, to the further heat transmission medium, which is flowing through the solar collectors, or the steam/water circuit of the solar power station, by pumping the heat carrier medium around, flowing through a heat transmission apparatus.

The heat transmission medium of the thermal energy store is stored, after this discharging process, in a further storage tank in the thermal energy store. For renewed charging, this heat transmission medium is then once again fed back into another or else into the previous storage tank, flowing through a heat transmission apparatus, in which the heat transmission medium circulating in the solar power station transmits heat or energy to the heat transmission medium of the thermal energy store during the sunshine phase.

Thermal energy stores of this type are known from practical use from a solar power station (SEGS I) which was commissioned in 1985. A thermal energy store such as this is also in use in the Solar Two trials power station in California. A thermal energy store in the form of a molten salt store has also been provided for the Andasol 1 solar power station that is currently being constructed, and this allows six hours of full-load operation of the Andasol 1 solar-thermal power station, without solar radiation. This thermal energy store comprises two storage tanks and has a total salt content of 28 000 t. In this case, as is illustrated in FIG. 1, the cooled salt is stored at a nominal temperature of 292° C. in a salt tank 1 which is "cold" after discharging, and the heated salt, or the heated molten salt, is stored after charging in the "hot" salt tank 2, at a nominal temperature of 384° C. At the start of the charging phase, the amount of salt or the molten salt is located in the salt tank 1 and is then pumped into the salt tank 2, as the second storage tank, during a sunshine and charging phase, by means of a feed apparatus 3, flowing through a heat transmission apparatus 4a, in which it is heated to the nominal temperature of about 384° C. by means of the further heat transmission medium, normally a thermal oil, which is circulating in the primary circuit of the solar-thermal power station. The molten salt is stored in the salt tank 2 until the discharge phase, which is illustrated in the right-hand part of the illustration in FIG. 1, starts during a phase when there is no sunshine. In this case, the molten salt is pumped back from the salt tank 2 into the salt tank 1, in the opposite direction to that during the charging phase, with the heat or energy which is stored in the molten salt or the heat transmission medium being emitted in the heat transmission apparatus 4b to the steam/water circuit of the power station, or possibly also to the further heat transmission medium which is flowing in the primary circuit of the solar-thermal power station.

The design of a thermal energy store such as this comprising a plurality of storage tanks depends on the solar radiation conditions at the respective site of the solar-thermal power station and on the energy demand that is satisfied by the power station. In this case, in particular, the energy demand which depends on the time of day and the time of year, and the energy provision strategy derived from this by the power station operator are particularly important.

Because of the installation-dependent constraints, the size of a storage tank is limited to about 15 000 m$^3$, which means that the maximum amount of thermal energy which can be stored with one tank is 1200 MWh. In order to allow larger amounts of thermal energy to be stored, the previous concept consists of multiplying the number of tanks, that is to say in each case using two, four, six, eight etc. cold salt tanks 1 and two, four, six, eight etc. hot salt tanks 2, instead of in each case one cold salt tank 1 and one hot salt tank 2.

A multiple tank system such as this, which is known from practical use and comprises two cold salt tanks 1 and two hot salt tanks 2, is illustrated in FIG. 2.

In order to make it possible to provide an energy storage system having a tank size of more than 15 000 m$^3$ and a storage capability of more than 1200 MWh, it has therefore been necessary until now to design a multiple tank system or a multiple tank configuration which is characterized by multiplication of the individual storage tanks on the so-called "cold" side (cold melt tank 1) and the "hot" side (hot salt tank 2). This leads to a considerable investment requirement which has to take account of each individual storage tank, and to a corresponding space requirement for each individual storage tank, and may have an adverse effect on the solar array which is provided for the solar-thermal power station by shadowing caused by the individual storage tanks.

SUMMARY OF INVENTION

The present invention relates to a system and a method for thermal energy store. In particular, at least one of the plurality of storage tanks is alternately used for storage of a respectively partially fed volume of the heat carrier medium in the state of its higher temperature and for storage of a respectively partially fed volume of the heat carrier medium in the state of its lower temperature. According to one development, it may be expedient in this case that heat carrier medium which is stored in an at least substantially filled first storage tank of the plurality of storage tanks is fed into an at least substantially empty storage tank of the plurality of storage tanks, flowing through the heat transmission apparatus, and heat carrier medium which is stored in an at least substantially filled second storage tank of the plurality of storage tanks is then fed into the substantially emptied first storage tank, flowing through the heat transmission apparatus.

In the case of a thermal energy store of the type mentioned initially, the above object is also achieved according to the invention in that at least one of the plurality of storage tanks alternately stores a partially fed heat carrier medium volume in the state of its higher temperature and a partially fed heat carrier medium volume in the state of its lower temperature. In this case, according to one development, it may be expedient that, of the plurality of storage tanks, one storage tank has an unfilled free volume which corresponds to a maximum feed volume of heat carrier medium to be fed from each of the plurality of storage tanks to a respective other of the plurality of storage tanks and the other storage tanks of the plurality of storage tanks are filled with their respective nominal volumes of heat carrier medium.

The invention now makes it possible to reduce the costs, the space requirement and the shadowing problems that result from this in that, in addition to the storage tanks which are filled with the heat carrier medium (in this case the molten salt) and form the respectively currently used storage capacity of the thermal energy store, which is in the form of a multiple tank system, only one additional empty tank is provided and present, which has a free volume which is sufficient to accommodate the feed volume to be fed, as defined by one of the filled storage tanks. Only three storage tanks are now required for the storage capacity of a previous four-tank system comprising two hot salt tanks and two cold salt tanks, with only four storage tanks being required for a previous six-tank system comprising three cold salt tanks and three hot salt tanks, and with only five storage tanks being required for a previous eight-tank system comprising four hot salt tanks and four cold salt tanks. This is achieved in that, both during the charging process of the thermal energy store of the thermal energy storage system of a solar power station during the sunshine phase and during the discharging of the thermal energy store, the amount of salt or the defined feed volume of heat transmission medium from a filled storage tank, depending on the charging process, may be a cold salt tank or a "cold" storage tank or a hot salt tank or a "hot" storage tank, is fed into the respectively unfilled storage tank, which has a free volume corresponding to the feed volume, and the feed volume of heat transmission medium is then fed to the previously emptied storage tank from a further storage tank which is still full. The measures according to the invention result in a sufficient unfilled free volume being available in one of the storage tanks at all times that the installation-specifically-provided and defined partial feed volume can in each case be fed from one tank into another tank and, in the process, while flowing through the respectively associated heat transmission apparatus, heat transmission can take place between the fed heat carrier medium and the primary circuit and/or the steam/water circuit of the solar-thermal power station.

In the case of a three-tank installation which comprises two full storage tanks filled with their rated volume or nominal volume and an empty storage tank which has the defined necessary unfilled free volume, at the start of a charging phase during a sunshine phase, the full tanks contain the heat transmission medium at a low temperature of, for example, 300° C. The feed volume is now pumped out of one of these full tanks into the empty storage tank. During this process, the heat carrier medium flows through the heat transmission apparatus where it absorbs energy from the heat transmission medium, which is likewise flowing therein, the primary circuit of the solar-thermal power station, and then stores this energy in the storage tank (hot salt tank) which is initially empty and is now becoming filled. When the initially full storage tank (cold salt tank) is now empty, the heat carrier medium is fed into this tank from the further full, filled storage tank (cold salt tank), flowing through the heat transmission apparatus. This originally "cold" storage tank is now being filled with the heated heat carrier medium, and thus becomes a "hot" storage tank. Conversely and in an analogous manner, during discharging of the thermal energy store, a feed volume of a full "hot" storage tank is emptied or replenished into an empty and "cold" storage tank, flowing through a heat transmission apparatus which is connected to the steam/water circuit and/or to the primary circuit of the solar-thermal power station, and the storage tank which is then in each case emptied is filled from another storage tank that is still full.

In its general aspect, the invention therefore comprises the capability to use at least one of the plurality of storage tanks in this way for storage of a volume, which is in each case fed partially flowing through a heat transmission apparatus, of the heat carrier medium in the state of its higher temperature ("hot") and for storage of a respectively partially fed volume of the heat carrier medium in the state of its low temperature ("cold"). While, in the prior art, one storage tank is in each case used either for the storage of the heat carrier medium in the state of its higher temperature or in the state of its lower temperature, the invention now provides for at least one tank to be used alternately both for storage of the heat carrier medium in the state of its higher temperature and in the state of its lower temperature, that is to say acting not only as a "hot" storage tank or hot salt tank but also as a "cold" storage tank or cold salt tank.

The invention makes it possible to reduce the necessary investment costs and the necessary space requirement in comparison to storage systems with the same storage capacity according to the prior art. Furthermore, in comparison to known systems with two stores, that is to say one hot salt tank and one cold salt tank, this doubles the storage capacity for the same storage tank size, even though only one additional tank (and not two) is provided. This makes it possible to lengthen the use of the solar power station in phases when there is no sunshine, that it to say in the evening and night-time hours.

The multiple tank system according to the invention of the thermal energy store can be implemented at low cost with a pump when this pump is connected to all the tanks, to carry fluid, and these tanks can be both filled and emptied by means of this single pump, as the embodiment of the invention finally envisages. With this design, there is no need for each tank to have an associated pump.

BRIEF DESCRIPTION OF DRAWINGS

The present invention will be explained in more detail in the following text with reference to the drawing, by way of example, in which.

DETAILED DESCRIPTION

Figure 3:
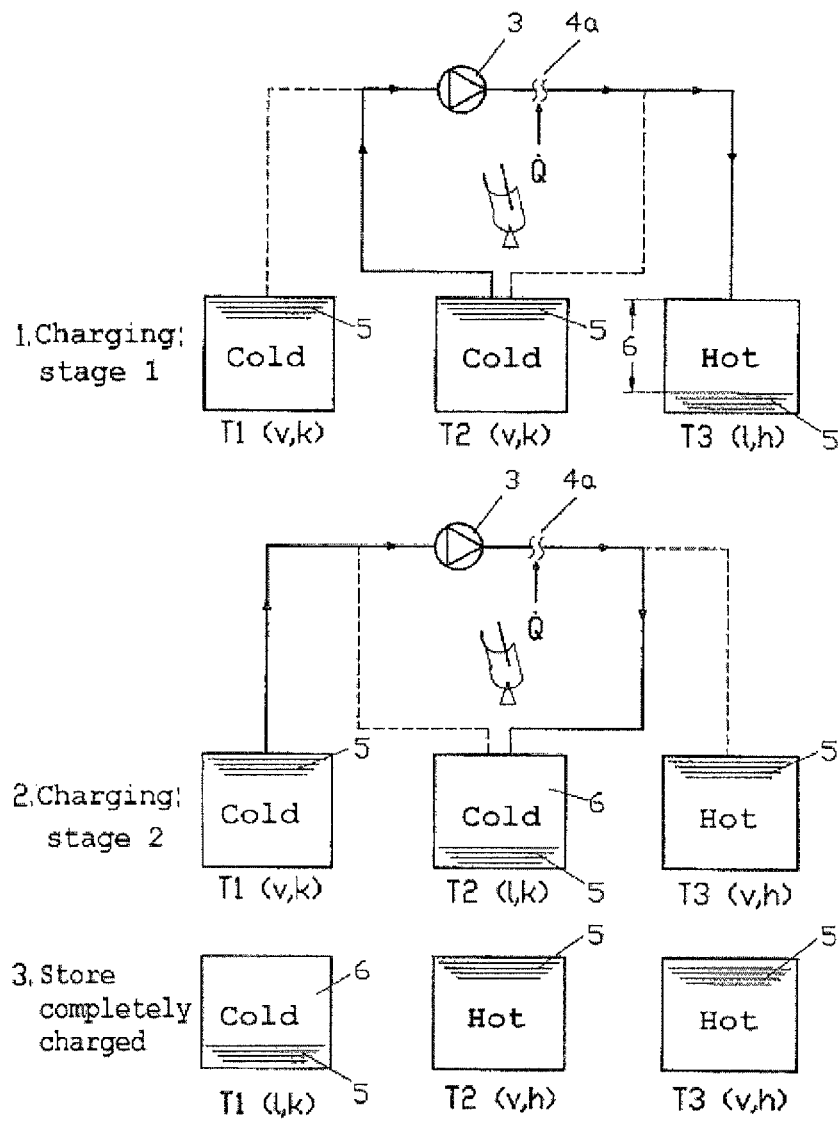
FIG. 3 shows a schematic outline illustration of a storage tank configuration according to the invention, in conjunction with a charging process.
Figure 4:
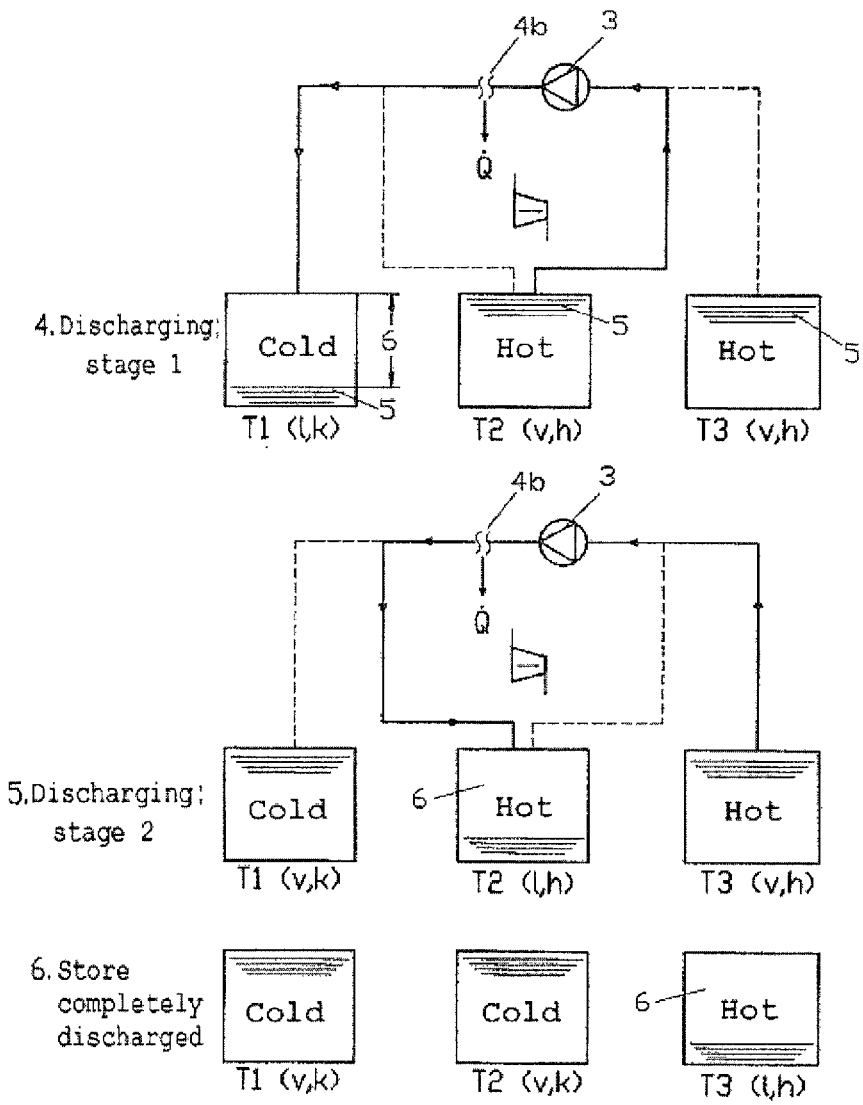
FIG. 4 shows a schematic outline illustration of the storage tank configuration according to the invention, as shown in FIG. 3, in conjunction with a discharging process.

The embodiment according to the present invention as illustrated in FIGS. 3 and 4 comprises a thermal energy store of a solar-thermal power station which comprises three storage tanks T1, T2 and T3. The tanks may be full, as is indicated by a lower-case v, or they may be empty, as indicated by a lower-case l. "Full" in this case means that the tanks are filled with their respective nominal volume of the heat carrier medium 5. The heat carrier medium 5 is a molten salt. A tank is referred to as being "empty" when it has the defined and predetermined unfilled free volume 6. This free volume 6 corresponds to the partial volume of heat carrier medium 5 fed partially from one of the storage tanks T1, T2 or T3, to the tank which in each case has the replenished free volume 6, during a respective charging process or discharging process of the heat carrier medium 5. The total storage capacity of the thermal energy store is formed by the heat carrier medium volume stored overall in all of the storage tanks which form the storage system of this thermal energy store, in the exemplary embodiment of the tanks T1, T2 and T3, that is to say this is formed by the sum of all the individual capacities of the respective tanks T1, T2 and T3. In the present exemplary embodiment, "hot" means the state of higher temperature of the heat carrier medium 5 which the latter assumes in the course of a charging process in the sunshine phases, when the corresponding heat carrier medium volume is fed, in particular pumped, through the heat transmission apparatus 4a from one storage tank to another storage tank. The heat transmission apparatus 4a is operatively connected to the heat carrier medium which is flowing through the primary circuit of the solar power station and which, in sunshine phases and charging phases of the thermal energy store, is at a higher temperature than the heat carrier medium 5 in the thermal energy store. In consequence, energy is emitted in the heat transmission apparatus 4a in the form of heat to the heat carrier medium 5 which is flowing through the heat transmission apparatus 4a, and this heat carrier medium 5 is heated to its state of higher temperature. Analogously, in phases without any sunshine and when the heat carrier medium 5 is being fed through the heat transmission apparatus 4b, heat and therefore energy are emitted from the heat carrier medium 5 to the heat carrier medium in the primary circuit of the solar-thermal power station or else, as in the example shown in FIG. 4, heat and energy are emitted from the heat transmission apparatus 4b, through which the heat carrier medium 5 is flowing, to the steam/water circuit of the power station in the heat transmission apparatus 4b. In this way, the volume of heat carrier medium 5 flowing through the heat transmission apparatus 4b is cooled to its state of lower temperature. This state of lower temperature is referred to as "cold". In the exemplary embodiment, the higher temperature may be 400° C. and the lower temperature 300° C. Even when the expression "empty" tank is used, this in fact is never completely emptied since, for hardware and process reasons, such as the risk of stresses occurring in the tank, the required minimum insertion depth of the pumps and the risk of freezing of the molten salt, the storage tanks T1, T2 and T3 are never emptied completely. In fact, a sufficient amount of the heat carrier medium 5, in the present case molten salt, is left in each of the storage tanks T1, T2 and T3 to ensure operation without any problems. The filling level of a tank T1, T2, T3 is indicated in FIGS. 1-4 by a horizontal line. In the same way, a "full" storage tank is never completely filled. "Empty" therefore means the minimum filling state, and "full" the respective maximum filling state of a storage tank T1, T2, T3, which represents the filling volume and/or nominal volume of the respective tank. The difference between the minimum and maximum filling state therefore represents both the feed volume fed from a tank and the free volume 6 which is available in an "empty" tank. The designation T1 (v,k) therefore means that the storage tank T1 is filled to the maximum level and that the storage medium is at a temperature of 300° C. (cold), while in contrast the designation T3 (l,h) means that the storage tank T3 is in its minimum filling state and that the heat transmission medium 5 is at a temperature of 400° C. (hot).

During a sunshine phase, the thermal energy store of the solar-thermal power station will now be charged with the heat to be stored, and in consequence with the energy to be stored. The initial state relating to this is shown in the upper part of the illustration in FIG. 3 as "1. charging: stage 1". The heat carrier medium 5 is in the state of lower temperature in the filled tanks T1 and T2, and the empty tank T3 has a free volume 6 and a minimum filling state of the heat carrier medium 5. The charging process now starts, and the heat carrier medium 5 is fed or pumped, as indicated by the black arrows, by means of the feed apparatus 3, which in this case is a pump, flowing through the heat transmission apparatus 4a into the hot storage tank T3, which has the free volume 6. In this case, part of the entire volume of the storage tank T2 (until the intended minimum filling level is reached), which represents only a portion of the total volume of heat carrier medium stored in the energy store, is fed or pumped into the storage tank T3, as a result of which the unfilled free volume 6 which initially exists there is filled with hot heat carrier medium 5, that is to say heat carrier medium 5 in the state of its higher temperature. The temperature of the heat carrier medium 5 is increased in the heat transmission apparatus 4a by the heat carrier medium 5 absorbing heat and energy there from the heat carrier medium which is circulated in the primary circuit of the solar-thermal power station. At the end of this first charging stage, hot heat carrier medium 5 at 400° C. is located in the storage tank T3, resulting in the storage tank configuration shown in the central part of FIG. 3, specifically one full and cold storage tank T1, one empty and cold storage tank T2 and one full and hot storage tank T3. After the heat carrier medium 5 has been moved from tank T2 to tank T3, there is now an unfilled free volume 6 in the storage tank T2. This is now followed by the second step "2. charging: stage 2:" in which the feed volume of heat carrier medium 5 which is still located in the storage tank T1 is now fed in the direction of the black arrows into the storage tank T2, flowing through the heat transmission apparatus 4a. The partially fed feed volume is likewise heated to 400° C., as a result of which, after completion of this charging process, this results in the storage tank configuration shown in the lower part of the illustration in FIG. 3. In this storage tank configuration, which is denoted by "3. store completely charged", the replenished free volume 6 is now in the cold and empty storage tank T1, and the two further storage tanks T2 and T3 are essentially, that is to say up to their maximum filling level, filled with hot heat carrier medium 5, in the present case at 400° C.

While the storage tanks T1 and T3 respectively remain "cold" or "hot" during this method step as illustrated in FIG. 3, the storage tank T2 changes from a cold state, in which it is filled with the heat carrier medium 5 in its state of lower temperature, to a hot state, during which it is filled with heat carrier medium 5 in its state of higher temperature.

Analogously to the charging process described above, the multiple tank system of the thermal store is discharged as is illustrated in FIG. 4. The state "3. store completely charged" shown in FIG. 3 now represents the initial state at the start of method step "4. discharging: stage 1", as shown in the upper part of the illustration in FIG. 4. The process of discharging the storage tanks T1, T2, T3 now starts here, and is carried out when there is no sunshine, in particular in the evening or at night. As can be seen from the upper part of the illustration in FIG. 4, hot heat carrier medium 5 is now fed from the storage tank T2 in the direction of the black arrows into the cold storage tank T1. During this process, the heat carrier medium 5 emits heat and in consequence energy in the heat transmission apparatus 4b to the steam/water circuit and/or to the primary circuit of the solar-thermal power station which are/is operatively connected thereto. In consequence, the temperature of the heat carrier medium 5 in the energy store falls, as a result of which this flows into the storage tank T1 at the "cold" temperature of 300° C. chosen in the present case. When the feed volume of the storage tank T2 has been moved completely to the storage tank T1, this results in the storage tank configuration illustrated in the middle part of the illustration in FIG. 4, in which the storage tank T1 is now completely filled with cold heat carrier medium 5, there is the free volume 6 in the storage tank T2, and the storage tank T3 is still filled with hot storage medium 5. This is followed by the step denoted "5. discharging: stage 2", in which the feed volume of the heat carrier medium 5 located in the storage tank T3 is fed or pumped into the storage tank T2, corresponding to the direction of the black arrows. During this process, the heat carrier medium 5 once again emits heat and energy in the heat transmission apparatus 4b to a heat carrier circuit, to the steam/water circuit and/or, in the case of one variant that is not illustrated, to the primary circuit of the solar-thermal power station. During this process, the heat carrier medium 5 is cooled to 300° C., as envisaged in the exemplary embodiment, resulting in the situation which is shown in the lower part of the illustration in FIG. 4 and is denoted by "6. store completely discharged", in which the storage tank T3 now has the free volume 6, and the storage tanks T1 and T2 are filled with "cold" heat carrier medium 5. Once again, when carrying out this discharging process as well, the storage tank T2 is used as a "hot" or else a "cold" storage tank.

A change can then once again be made from the situation illustrated in the lower part of the illustration in FIG. 4 to the situation shown in the upper part of the illustration shown in FIG. 3, with the thermal energy store being charged once again.

Although the method for a storage tank configuration has been described with three storage tanks T1, T2 and T3, this can be transferred in an analogous and identical manner to other multiple tank systems as well, in which, in addition to storage tanks which are completely filled with heat carrier medium 5, all that need be provided in each case is one additional storage tank which has the free volume 6.

Figure 1:
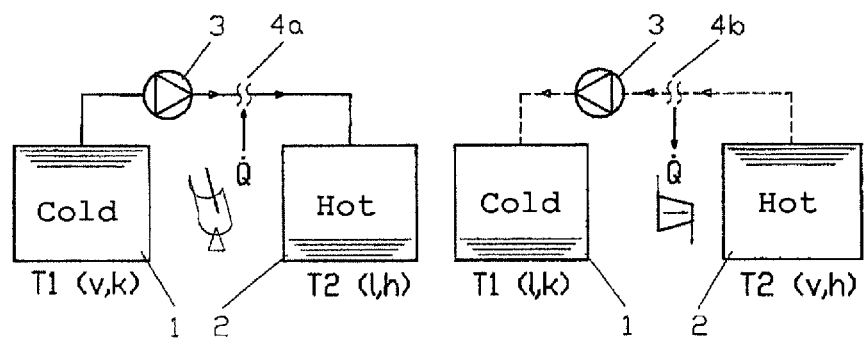
FIG. 1 shows a schematic outline illustration of a storage tank configuration according to the prior art.
Figure 2:
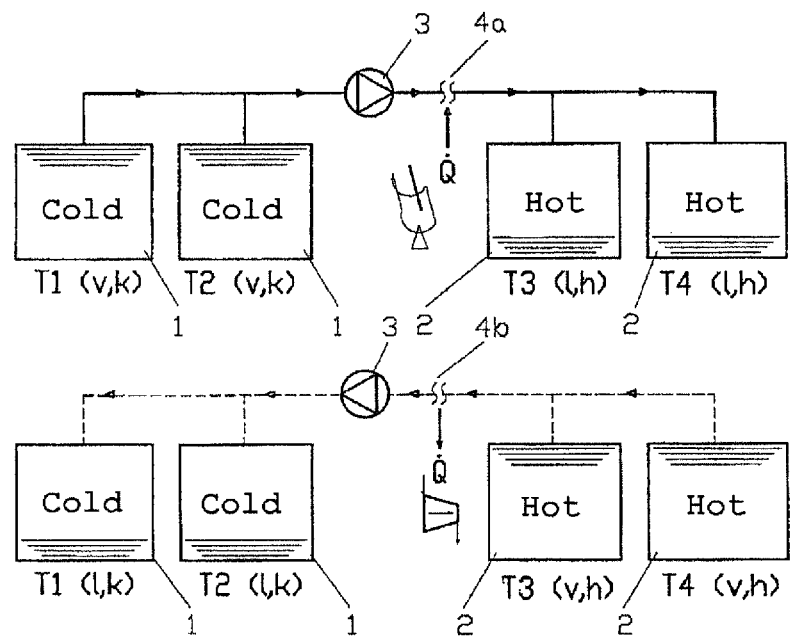
FIG. 2 shows a schematic illustration of a further storage tank configuration according to the prior art.

In times in which the full storage capacity is not used, it is, of course, also possible, in a manner that is not illustrated, to feed the heat carrier medium 5 only from one tank to another and back, analogously to the procedure known from the prior art as shown in FIG. 1.

Only in each case one pump 3 and one heat transmission apparatus 4a, 4b are illustrated in the exemplary embodiment. It is therefore possible to connect all the tanks T1, T2 and T3 in a circular or star form to the single pump 3 such that each tank T1, T2 or T3 can be both filled and emptied by that pump. However, it is also possible to provide a plurality of pumps, in particular one pump for each tank, and also to provide different heat transmission apparatuses 4a, 4b. This means that it is not only possible to use one heat exchanger apparatus 4a for the purpose of the charging process illustrated in FIG. 3, which is operatively connected to the primary circuit, that is to say to the heat carrier medium circuit of a solar-thermal power station, as is indicated by the solar collector illustrated symbolically in FIG. 4, and to provide a heat exchanger as the heat transmission apparatus 4b, for the purposes of the discharge process illustrated in FIG. 4, which is operatively connected to the steam/water circuit of the respective solar-thermal power station, so that by means of the heat exchanger apparatus illustrated in FIG. 4 heat is emitted to a water/steam medium, to be supplied to a steam turbine, in the steam/water circuit of the respective solar-thermal power station, from the heat carrier medium 5, as is indicated by the symbolically illustrated steam turbine. It is also possible to provide only one type of heat transmission apparatus, through which flow is passed both during the charging process and the discharging process of the energy store, and which is exclusively operatively connected, for example, to the primary circuit or to the steam/water circuit of the solar power station. It is therefore possible for a heat carrier medium, for example a molten salt, to flow between the tanks T1, T2 and T3, which is connected via a heat transmission apparatus 4a to a primary circuit of a solar-thermal power station, in which a molten salt is likewise passed through the solar collectors as a heat carrier medium in the primary circuit. This heat carrier medium in the primary circuit is then connected by means of a second heat transmission apparatus to the steam/water circuit of the solar-thermal power station. In sunshine phases, the heat carrier medium 5 now absorbs energy from the primary circuit via a heat transmission apparatus 4a, and stores this energy in the energy store comprising the tanks T1, T2 and T3. In phases when there is no sunshine, the heat carrier medium 5 can now emit the stored energy via the heat transmission apparatus 4a to the primary circuit again, which then transmits this energy to the steam/water circuit. However, it is also possible to provide for the energy which is stored in the form of heat in the heat carrier medium 5 to be transmitted via a different heat transmission apparatus 4b directly as energy to the steam/water circuit during phases in which there is no sunshine.

It is likewise possible for oil to circulate as the heat carrier medium in the primary circuit, which oil transmits heat to the heat carrier medium 5 via a heat transmission apparatus 4a in sunshine phases. This energy which is stored in the heat carrier medium 5 can then likewise either be transmitted via the heat transmission apparatus 4a to the heat carrier medium of the primary circuit, in this case an oil, during phases in which there is no sunshine, or else energy can also be emitted in the form of heat directly to the steam/water circuit of the power station via a second heat transmission apparatus 4b.

A further alternative comprises there being only one power station circuit in which, for example, water flows as the heat carrier medium through the solar collectors, is passed in the form of steam to turbines, and is once again supplied, in condensed form, to the solar collectors. In a steam/water circuit such as this which, at the same time, is the primary circuit of the solar-thermal power station, thermal energy can then be transmitted to the heat carrier medium 5 which is stored in the tanks T1, T2 and T3, from the heat carrier medium, via a heat transmission apparatus 4a or 4b during sunshine phases. During phases in which there is no sunshine, the thermal energy is then transmitted back to the direct vaporization circuit via the respective heat transmission apparatus 4a or 4b.

Fundamentally, the method according to the invention and the thermal energy store according to the invention can be used with any type of primary circuit and/or secondary circuit and with any type of heat carrier medium used or fed therein. The essence of the invention relates to the storage of the energy which is obtained and is not used during sunshine phases, in an energy store which comprises a multiplicity of tanks T1 to Tn.

The invention claimed is:

1. A method for alternate storage and outputting of a thermal energy which is obtained in a primary circuit of a solar-thermal power station, using a heat carrier medium, comprising:

partially feeding the heat carrier medium between a plurality of storage tanks, in each case flowing through a heat transmission apparatus which is operatively connected to at least one of the primary circuit and a steam/water circuit, the heat carrier medium being one of heated to a higher temperature and cooled to a lower temperature, and in at least one of the plurality of storage tanks, alternately storing (a) a respectively partially fed volume of the heat carrier medium in a first state of a higher temperature and (b) a respectively partially fed volume of the heat carrier medium in a second state of a lower temperature.

2. The method as claimed in claim 1, wherein a first portion of the heat carrier medium is stored in an at least substantially filled first storage tank of the plurality of storage tanks, the first portion being fed into an at least substantially empty second storage tank of the plurality of storage tanks, the first portion flowing through the heat transmission apparatus and wherein a second portion of the heat carrier medium is stored in an at least substantially filled third storage tank of the plurality of storage tanks, the second portion being then fed into the substantially emptied first storage tank, the second portion flowing through the heat transmission apparatus.

3. The method as claimed in claim 1, wherein the feeding process is carried out both during the charging process and the discharging process of the thermal energy store.

4. The method as claimed in claim 1, wherein the heat carrier medium is pumped around between the storage tanks.

5. The method as claimed in claim 1, wherein a molten salt is stored and fed as the heat carrier medium.

6. A thermal energy store of a solar-thermal power station, comprising:
 a plurality of storage tanks connected to one another to carry fluid;
 a feed device; and
 a heat transmission apparatus operatively connected to at least one of a primary circuit and a steam/water circuit of the solar-thermal power station,
 wherein the plurality of storage tanks store a volume of a heat carrier medium, the heat carrier medium being partially fed between individual storage tanks flowing through the heat transmission apparatus and one of heated to a higher temperature and cooled to a lower temperature, and
 wherein at least one of the plurality of storage tanks alternately stores a partially fed heat carrier medium volume in a state of a higher temperature and a partially fed heat carrier medium volume in a state of a lower temperature.

7. The energy store as claimed in claim 6, wherein, one of the plurality of storage tanks has an unfilled free volume which corresponds to a maximum feed volume of heat carrier medium to be fed from each of the plurality of storage tanks to a respective other of the plurality of storage tanks, and wherein the remaining storage tanks of the plurality of storage tanks are filled with their respective nominal volumes of the heat carrier medium.

8. The energy store as claimed in claim 6, wherein the plurality of storage tanks have at least one of the same filling volume and a nominal volume.

9. The energy store as claimed in claim 6, wherein, one of the plurality of storage tanks has an unfilled free volume, and wherein the remaining tanks of the plurality of storage tanks are at least substantially completely filled with the heat carrier medium.

10. The energy store as claimed in claim 6, wherein the heat carrier medium is a molten salt.

11. The energy store as claimed in claim 6, wherein the storage tanks are connected to carry fluid to a pump, and are filled and emptied using the pump.

* * * * *